Patented Feb. 21, 1950

2,498,433

UNITED STATES PATENT OFFICE 2,498,433

1,3 DIMETHYL-4-PROPIONOXY-4-PHENYL-PIPERIDINE AND ACID ADDITION SALTS THEREOF

John Lee, Essex Fells, and Albert Ziering, Newark, N. J., assignors to Hoffmann-La Roche Inc., Nutley, N. J., a corporation of New Jersey No Drawing. Application July 8, 1946, Serial No. 682,132

2 Claims. (Cl. 260—294)

The present invention relates to new 3-methyl-substituted piperidine compounds and methods for preparing them. The new compounds can be represented by the following formula:

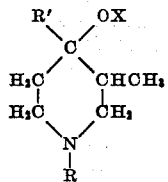

and the salts thereof.

In the above formula, R stands for a hydrocarbon substituent, preferably a lower alkyl radical, as for example, methyl, ethyl, propyl and the like or an aralkyl radical as for example benzyl; R' represents a carbocyclyl radical as, for example, aryl, such as phenyl, and cycloaliphatic, as for instance cyclohexyl; X represents hydrogen, lithium, MgHal, as for example MgCl, MgBr, MgI, or an acyl radical as, for example, acetyl, propionyl, butyrl, benzoyl, furoyl, succinoyl and the like. The salts of the compounds coming under Formula A may be those of organic or inorganic acids as, for example, the hydrohalides, ethanesulfonates, tartrates, malates, citrates, isethionates, and the like.

The compounds may be obtained in the form of the optically active compounds by the employment of optically active acids to form the salts as, for example, malic acids, tartaric acids, dibenzoyltartaric and ditolyltartaric acids.

When X in the above formula stands for lithium, the compounds are piperidine oxylithium complexes which can be represented by the following formula:

I

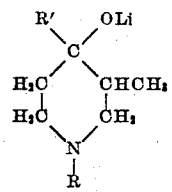

When X in the above formula stands for MgHal, the compounds can be represented by the following formula:

II

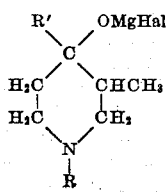

When X in Formula A stands for hydrogen, the compounds are piperidinols having the following formula:

III

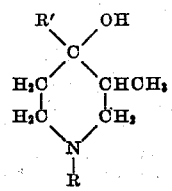

When X in Formula A stands for acyl, the compounds have the following formula:

IV

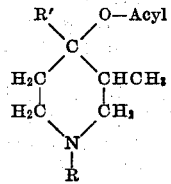

In each of Formulas I, II, III and IV, R and R' have the same significance as is in Formula A.

Compounds represented by Formulas I, II, and III have properties which render them superior to compounds which do not have a methyl substituent in the 3-position. It has been found that when they are employed in the synthesis of compounds of Formula IV, that the latter compounds have not only a powerful analgesic and spasmolytic action, but unexpectedly, extremely low toxicity and excellent stability with no side effects, as compared with compounds unsubstituted by a methyl group in the 3-position. For example, while 1-methyl-4-phenyl-4-propionoxy-piperidine hydrochloride possesses a satisfactory analgesic effect, it causes in experimental animals, decided spasticity and is toxic in mice in the range of 40 mg. per kg. body weight. Furthermore, the compound is highly unstable in aqueous solution. On the other hand, 1,3-dimethyl-4-phenyl-4-propionoxy-piperidine hydrochloride reduces the toxicity to 200 mg. per kg. body weight, causes no spasticity in experimental animals and is stable in aqueous solution, while still possessing a high analgesic activity.

The lithium complexes as represented by Formula I can be prepared by reacting lithium-aryls with 1-alkyl-3-methyl-4-piperidones. The reaction of lithium compounds on piperidones forms the subject matter of application Serial No. 682,134, filed July 8, 1946. The Grignard complexes of Formula II can be obtained by Grignardizing the aforementioned 1-alkyl-3-methyl-4-piperidones. The piperidinols as represented by Formula III can be prepared by decomposing or hydrolyzing the lithium or Grignard complexes of Formulae I and II with water.

The acyloxy compounds of Formula IV can be prepared by acylating with acyl halides or anhydrides the piperidinols of Formula III or by directly acylating the lithium and Grignard complexes of Formulae I and II without the intermediate hydrolysis of the complexes to the piperidinol compounds. It is advantageous to carry out the acylation of the piperidinols in the presence of a small amount of a catalyst, such as sulfuric acid or sodium acetate. The acylation may also be carried out in the presence of an acid binding agent, such as pyridine or potassium carbonate, particularly where an acyl halide is employed as the acylating agent.

The following examples will serve to illustrate the invention, it being understood that they are given by way of illustration and not by way of limitation.

Example 1

In a round-bottom flask provided with stirrer, dropping funnel, condenser and a gas outlet for keeping the system under nitrogen, 200 cc. of dry ether is placed and 4.6 grams of lithium cut into thin strips is added. 52 grams of bromobenzene in 50 cc. of dry ether are added dropwise and after addition, the mixture is refluxed for 2 hours. This procedure results in the formation of phenyl-lithium. Other aryl-lithium compounds can be prepared in a similar manner by reacting lithium metal or a lithium compound capable of transferring lithium and a compound having an exchangeable halogen group as, for example, bromonaphthalene.

The solution of phenyl-lithium is cooled to −20° C. and to this a solution of 12.7 grams of 1,3-dimethyl-4-piperidone, prepared according to the method of Howton, J. Org. Chem. 10, 277 (1945), in ether is added dropwise with stirring. After the addition, the stirring is continued for a further 2 hours at −20° C. The lithium complex, 1,3-dimethyl-4-phenyl-4-oxylithium piperidine, which forms is soluble in the ether and can be recovered therefrom. To prepare the piperidinol, the lithium complex, while in the reaction mixture is decomposed by the addition of an ice and hydrochloric acid mixture. The acidified layer is separated, basified and extracted with ether. After drying the ether solution and removing the solvent, the residue on distillation in vacuum distills chiefly at 155° C./10 mm., yielding the product, 1,3-dimethyl-4-phenyl-4-hydroxy piperidine, which, on crystallization from n-hexane melts at 102° C. On treatment with propionic anhydride catalyzed with a trace of sulfuric acid, 1,3-dimethyl-4-propionoxy-4-phenyl piperidine is attained. The latter compound can be converted into the hydrochloride salt by reaction with hydrogen chloride. This salt after crystallization from acetone has a melting point of 209° C. By employing acetic acid anhydride, 1,3-dimethyl-4-acetoxy-4-phenyl-piperidine and its hydrochloride can be obtained.

Following the procedure in the above example, but employing 1-ethyl-3-methyl-4-piperidone prepared in a similar manner to the corresponding 1,3-dimethyl-piperidones there can be obtained the following compounds:

1-ethyl-3-methyl-4-phenyl-4-oxylithium piperidine,
1-ethyl-3-methyl-4-phenyl-4-hydroxy piperidine,
1-ethyl-3-methyl-4-phenyl-4-propionoxy piperidine and the salts of the last two mentioned compounds. By the employment of acetic, butyric, benzoic, furoic and succinic acid anhydrides or chlorides the corresponding acetoxy, butyroxy, benzoxy, furoxy and succinoxy compounds can be obtained.

Example 2

3 grams of 1,3-dimethyl-4-phenyl-4-hydroxy piperidine are dissolved in 100 cc. of alcohol and 1.5 cc. of concentrated hydrochloric acid is added. The solution is hydrogenated under 1000 pounds' pressure of hydrogen at 80° C. for 3 hours in the presence of 600 mg. of Adam's platinum catalyst. After cooling, the catalyst is removed by filtration and the filtrate is evaporated to dryness. The residual white salt, which corresponds to the formula of 1,3-dimethyl-4-cyclohexyl-4-hydroxy piperidine hydrochloride, recrystallized from acetone-methanol melts at 243–244° C. The salt as obtained above is dissolved in water, alkalinized with sodium hydroxide and the resultant base is extracted with ether. The ethereal solution after drying over sodium sulfate is distilled down and the resultant free base dissolved in 10 cc. of propionic anhydride and 1 drop of concentrated sulfuric acid is added as a catalyst. The mixture is refluxed on a steam bath for 3 hours, the larger part of the propionic anhydride removed in vacuum, and the residue poured onto an ice bath. This is extracted with ether, the ethereal solution is dried over sodium sulfate for 12 hours, filtered and hydrogen chloride is passed into the filtrate. A hydrochloride separates out, which on recrystallization from ethyl acetate yields colorless, shiny crystals, melting at 205–6° C. This compound corresponds to the formula for 1,3-dimethyl-4-cyclohexyl-4-propionoxy piperidine hydrochloride.

In the same manner, but employing butyric, benzoic, furoic and succinic acid anhydrides or their chlorides, the corresponding butyroxy, benzoxy, furoxy and succinoxy compounds can be obtained.

The production of 4-cyclohexyl piperidine compounds by hydrogenation of the 4-phenyl piperidinols forms the subject matter of application Serial No. 682,133, filed July 8, 1946, by Lee and Berger.

Example 3

300 g. of benzylamine and 420 g. of methyl methacrylate are mixed with 300 cc. of methanol and allowed to stand for 4 days at room temperature. The methanol and excess methyl methacrylate are removed in vacuo and the residue is distilled in vacuo there being obtained (β-methyl-β-carbomethoxy)-ethyl-benzylamine.

289 g. of (β-methyl-β-carbomethoxy)-ethyl-benzylamine are mixed with 240 g. of ethyl acrylate and heated in an autoclave at 120° for 4 hours. On removal from the autoclave the reaction mixture is fractionated in vacuo and the fraction boiling at 170°/3 mm. is obtained. The compound is N-(β-methyl-β-carbomethoxy-ethyl)-N-(β-carboethoxy-ethyl)-benzylamine.

In a flask equipped with stirring apparatus, reflux condenser and dropping funnel is placed 1500 cc. of toluene and 25.3 g. of sodium shot is added. The mixture is brought to stirring to 100° C. and the diester is added gradually. After the addition is completed the flask is heated for a further 2 hours with stirring and then cooled to room temperature. 1000 cc. of water is added through the dropping funnel and the solid which separates is brought to solution by the addition of 400 cc. of concentrated hydrochloric acid. The toluene layer is separated and the aqueous layer is heated under reflux to saponify the 1-benzyl-3-methyl-5-carboethoxy-4-piperidone formed. When the solution gives no color or only a faint trace of color when it is tested with ferric chloride solution, it is concentrated in vacuum and the residue is basified with 50% sodium hydroxide solution. The liberated 1-benzyl-3-methyl-4-piperidone boils at 242° C./3 mm.

3.7 g. of lithium wire is cut into small pieces and added to 300 cc. of dry ether in a reaction flask equipped with stirring apparatus dropping funnel, reflux condenser and provided with devices to maintain the operation under an atmosphere of nitrogen.

42 g. of bromobenzene is added in portions with stirring and when all has been added the ether solution is refluxed for 1 hour. The flask and contents are then cooled in an ice bath and 40.6 g. of 1-benzyl-3-methyl-4-piperidone is added dropwise with stirring. After the addition, stirring is continued for 1 hour; 100 cc. of water is then added in small portions. The ether layer separated and dried over anhydrous potassium carbonate. The ether is filtered from the potassium carbonate and the ether removed by distillation. The residue on fractionation yields 1-benzyl-3-methyl-4-phenyl-4-hydroxy-piperidine boiling at 220° C./5 mm.

The piperidinol so obtained may be transformed into esters such as the propionate, benzoate and the like, in the manner described in the previous examples.

*Example 4*

In an apparatus for performing Grignard reactions 2.4 g. magnesium is added to 100 cc. of dry ether. To this, with stirring, 15.7 g. of bromobenzene is added dropwise. After this addition the ether is refluxed for 1 hour when the transformation of the Grignard reagent is complete. The flask and contents are then cooled in an ice bath and a solution of 20.3 g. of 1-benzyl-3-methyl-4-piperidone in 100 cc. of ether is added dropwise. After the addition the reaction mixture is refluxed for 2 hours, the flask cooled by means of an ice bath and 50 cc. of saturated ammonium chloride is added in portions with stirring followed by the addition of 100 cc. of water. The ether layer is separated, dried over potassium carbonate, filtered, the ether removed and the residue fractionated. This yields 1-benzyl-3-methyl-4-phenyl-4-hydroxy-piperidone identical to that obtained in the previous example.

We claim:

1. 1,3-dimethyl-4-propionoxy-4-phenyl-piperidine and the said addition salts thereof.
2. 1,3-dimethyl-4-propionoxy-4-phenyl-piperidine hydrochloride.

JOHN LEE.
ALBERT ZIERING.

REFERENCES CITED

The following references are of record in the file of this patent:

UNITED STATES PATENTS

| Number | Name | Date |
|---|---|---|
| 2,151,047 | Preisewerk | Mar. 21, 1939 |
| 2,411,664 | Miescher et al. | Nov. 26, 1946 |

FOREIGN PATENTS

| Number | Country | Date |
|---|---|---|
| 60,592 | Denmark | Feb. 1, 1943 |
| 552,065 | Great Britain | Mar. 22, 1943 |

OTHER REFERENCES

Blicke et al.: J. Amer. Chem. Soc., vol. 53, pp. 1017, 1023 (1931).

Lehmstedt et al.: Chem. Abstr., vol. 33, p. 5403 (1939).

Erickson: Chem. Abstr., vol. 36, p. 2853 (1942).

Willemart: Chem. Abstr., vol. 37, p. 5053 (1943).

Howton: Jour. Org. Chem., vol. 10, pp. 277, 280 (1945).

Certificate of Correction

Patent No. 2,498,433 February 21, 1950

JOHN LEE ET AL.

It is hereby certified that errors appear in the printed specification of the above numbered patent requiring correction as follows:

Column 1, line 5, the letter $A$, designating the formula, should be inserted to the extreme left thereof; column 6, line 15, for the word "said" read *acid*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*